O. O. STORLE.
Harvester-Rakes.
No. 155,771.  Patented Oct. 6, 1874.
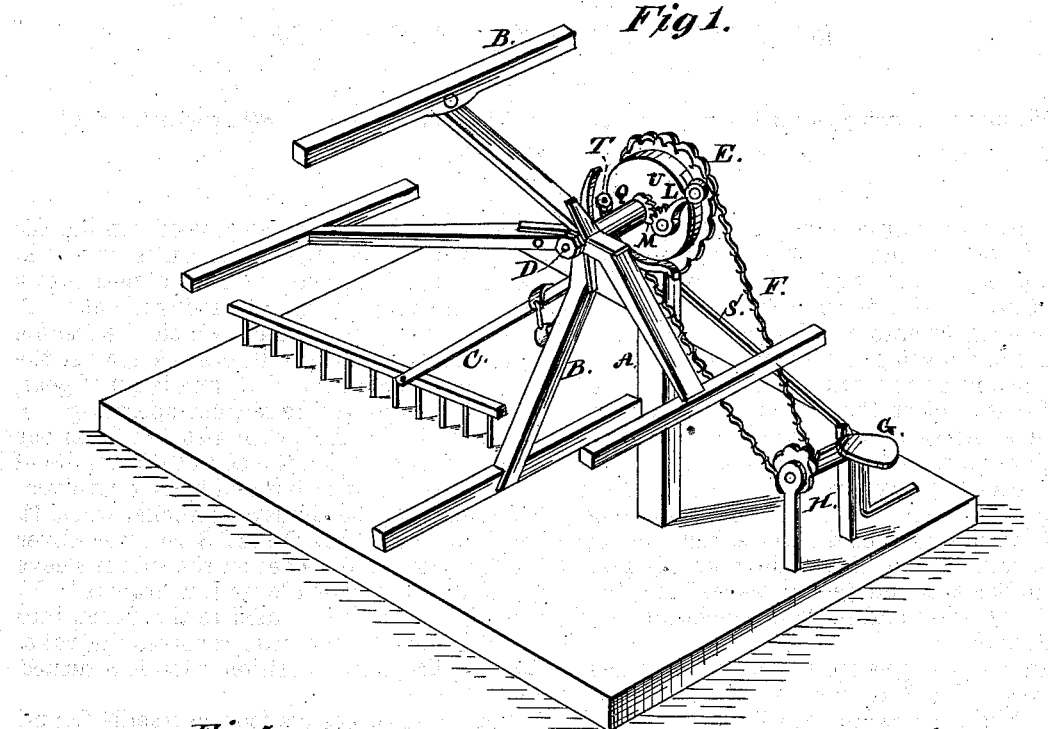
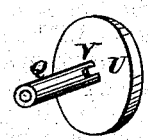
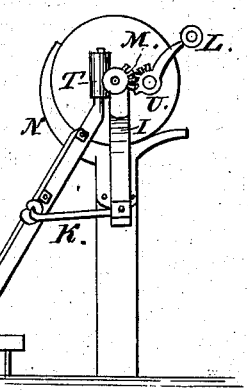
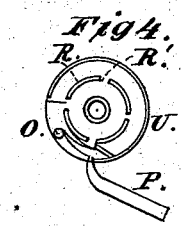
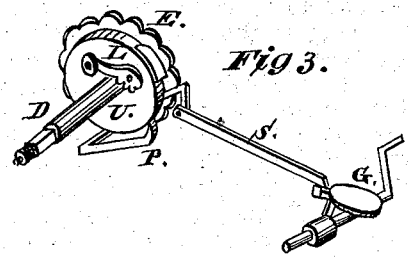
Witnesses:
Inventor:
Ole O. Storle

UNITED STATES PATENT OFFICE.

OLE O. STORLE, OF MILWAUKEE, WISCONSIN, ASSIGNOR OF ONE-THIRD HIS RIGHT TO JOHN O. OVERBY, OF SAME PLACE.

IMPROVEMENT IN HARVESTER-RAKES.

Specification forming part of Letters Patent No. 155,771, dated October 6, 1874; application filed December 20, 1873.

*To all whom it may concern:*

Be it known that I, OLE O. STORLE, of Milwaukee, in the county of Milwaukee, in the State of Wisconsin, have invented certain Improvements in Harvester-Rakes, of which the following is a specification:

My invention is a rake for a harvester, and has for its object the stopping of the rake, whenever necessary, for grain enough to accumulate on the platform for a sheaf.

The rake will rake off the grain every revolution of the reel, if left to itself; but whenever the grain is light the driver puts his foot onto a treadle and stops the rake till grain enough has accumulated for a sheaf, and then he raises his foot and the rake comes into gear and goes on.

Figure 1 is a perspective view of the rake and reel. Fig. 2 is a sectional view of the rake. Fig. 3 is a sectional view, showing the sprocket-wheel which operates the rake and reel, and showing also the treadle and intermediate mechanism. Fig. 4 is a view of the hook which is thrown out of gear to stop the rake, and the inside of the drum and rim, which operates the rake and reel; and Fig. 5 is a view of the drum and hollow sleeve, which stands still when the treadle is pressed down.

A is the frame; B, the reel; C, the rake; D, the shaft of the rake and reel; E, the sprocket-wheel, which operates the rake and reel; F, chain which operates the sprocket-wheel; G, treadle on which to put the foot to stop the rake; H, a small sprocket-wheel on a shaft, over which the chain runs, to drive the wheel E; I, short arm connected with the drum U and to the rake to turn it out as it approaches the end of its throw; K, rod from the rake to shaft I; L, lever with cogs on its end meshing into cogs on sleeve Q, and on the outer end a roller. This lever is pivoted to drum U, and as it revolves with the drum the roller on its end strikes on cam-way N and turns the sleeve Q and brings the rake back in front of the reel to rake off another gavel; M, cogs on sleeve Q; N, cam-way bolted on under lever L, for the purpose of turning the rake by the lever L when it comes over and strikes on it; O, hook which catches into a recess in rim R, which revolves the rake; P, lever secured to the frame, which the treadle G, by rod S attached to it, presses against the outer end of hook O and throws it out of gear, and thus stops the rake from operating; Q, sleeve on the shaft D, with a socket, T, on one side of it, into which the end of the handle of rake C fits, and turns out and in as it revolves; R', recesses in the rim R on sprocket-wheel E, and into which hook O fits; S, rod from lever P to treadle G; T, socket on the side of sleeve Q; U, drum to which lever L is attached; V, a notch in the sleeve next to the drum, into which fits arm I, and thus revolves the rake, and also keeps it in position when it is turned up.

The driver places his foot on treadle G, and that, drawing on rod S, pulls on lever P and pulls the hook O out of the rim R, and the operation of the rake is suspended. When enough grain is cut and falls on the platform for a sheaf the foot is raised from the treadle G, and the spring connected with hook O will raise it up and throw hook O into the slot in rim R, and drum M, revolving, will turn the lever L, and as it turns the tail of it will strike against cam-way N, which will turn it, and as it turns the cogs on the other end of it, meshing into the cogs on sleeve Q and turning the sleeve, bring the rake back in front of the reel, to rake off a gavel. The arm I, connected with the drum and the rake C by rod K, turns the rake out as it approaches the end of the throw, and so on.

I claim as my invention—

The combination of sleeve Q, gear-section M, lever L, camway N, and arm I, for operating the rake, substantially as described.

OLE O. STORLE.

Witnesses:
J. B. SMITH,
JOHN O. OVERBY.